United States Patent [19]

Wraight

[11] Patent Number: 5,442,173

[45] Date of Patent: Aug. 15, 1995

[54] METHOD AND SYSTEM FOR REAL-TIME MONITORING OF EARTH FORMATION FRACTURE MOVEMENT

[75] Inventor: Peter D. Wraight, Missouri City, Tex.

[73] Assignee: Schlumberger Technology Corporation, Houston, Tex.

[21] Appl. No.: 206,983

[22] Filed: Mar. 4, 1994

[51] Int. Cl.$^6$ ................................................. G01V 5/12
[52] U.S. Cl. ..................................... 250/260; 250/259
[58] Field of Search ................. 250/260, 256, 259, 265

[56] References Cited

U.S. PATENT DOCUMENTS

| | | |
|---|---|---|
| 3,784,828 | 1/1974 | Hayes . |
| 4,415,805 | 11/1983 | Fertl et al. ........................ 250/260 |
| 4,439,677 | 3/1984 | Martin ............................... 250/260 |
| 4,493,999 | 1/1985 | Catchen ............................. 250/260 |
| 4,731,531 | 3/1988 | Handke . |
| 4,825,073 | 4/1989 | Smith, Jr. et al. ................. 250/260 |
| 4,857,729 | 8/1989 | Gadeken et al. .................. 250/260 |
| 4,861,986 | 8/1989 | Arnold . |
| 5,050,674 | 9/1991 | Soliman et al. . |
| 5,077,471 | 12/1991 | Smith, Jr. et al. ................. 250/260 |
| 5,094,808 | 3/1992 | Meek . |

OTHER PUBLICATIONS

"Determination of Fracture Height by Spectral Gamma Log", Oct. 5, 1986, Authors: J. A. Anderson, C. M. Pearson, A. S. Abou-Sayed, G. D. Myers.

Primary Examiner—Carolyn E. Fields
Attorney, Agent, or Firm—Henry N. Garrana; Darcell Walker

[57] ABSTRACT

A method of monitoring formation fractures in real-time is performed in which a fluid containing a radio-active tracer element is pumped at a high pressure down a wellbore into a formation. As the fluid creates fractures and moves through the formation gamma-rays are emitted from the radio-active tracer element in the fluid. Detector means placed at predetermined locations in the wellbore continuously detect these gamma-rays. Gamma-rays emitted from wellbore fracture fluids are distinguished from formation gamma-rays and the detected formation gamma-rays are counted. As the fracture fluid approaches the height or vertical depth of these detector means, the gamma-ray count increases. Once the gamma-ray count reaches a predetermined level, the fracture will have reached a desired location in the formation and pumping of the fracture fluid will stop.

32 Claims, 3 Drawing Sheets

METHOD AND SYSTEM FOR REAL-TIME MONITORING OF EARTH FORMATION FRACTURE MOVEMENT

FIELD OF THE INVENTION

This invention relates to a method and system of earth formation logging and more specifically, a method and system of monitoring formation fractures in real-time (during the fracturing process) using radio-active tracers injected into the earth formation.

BACKGROUND OF THE INVENTION

It has been known for several years that the yield of hydrocarbons, such as gas and petroleum, from wells can be increased by fracturing the formation containing such hydrocarbons in order stimulate the flow of these hydrocarbons in the well. Various formation fracturing procedures have been proposed and many are now used in fracturing operations. Among these procedures are treatments with various chemicals (usually acids in aqueous solutions), hydraulic fracturing in which liquids are injected into the formation under high pressure (usually with propping agents), explosive methods in which explosives are detonated within the formations to effect mechanical fracture, and combinations of these procedures.

Hydraulic fracturing, the fracturing process of the present invention, is well known in the industry. During a typical hydraulic fracturing operation, a slurry, containing a viscous base fluid and a solid particulate material usually referred to as a "proppant", is pumped down the well at sufficient pressure to fracture open the producing formation surrounding the well. Once a fracture has been created the pumping of the slurry is typically continued until a sufficient volume of the proppant has been carried by the slurry into the fracture. After a suitable time the pumping operation is stopped at which time the proppant residue will prop open the fracture in the formation, preventing it from closing. As a result of the fracture, trapped hydrocarbons are freed and the flow from the producing formation is increased thereby increasing the wells production. In addition to creating deep-penetrating reservoir fractures, the fracturing process is useful in overcoming wellbore damage, to aid in secondary operations and to assist in the injection or disposal of industrial waste material.

During the fracturing process, the fractures propagate throughout the formation. The vertical propagation of these fractures is of particular importance. Fracture height measurements enable well operators to determine the success of the fracturing operation and, if necessary, to optimize future treatments, for other wells in the field. In addition, fracture height information can aid in the diagnosis of post-well stimulation problems such as lower production rates or unfavorable water cuts. The fracture height data can indicate whether communication has been established between the producing formation and adjacent water or non-producing formation zones. Height measurements also provide a check on the accuracy of fracture design simulators used prior to the job to predict fracture geometry. Excessive fracture height implies that the fracture length is shorter than the design value.

As previously stated, one reason for monitoring the vertical propagation of a formation fracture is the concern of fracturing out of a defined hydrocarbon producing zone into an adjacent water-producing zone. When this occurs, water will flow into the hydrocarbon-producing zone and the wellbore. This situation results in a well that produces mainly water instead of the desired hydrocarbon. Furthermore, if there is still the desire to continue producing hydrocarbons from the well, operators must solve the serious problem of safely disposing the produced, but undesired water. Addressing the problems arising from an out of zone fracture will also add expenses to the operations. In addition, if the fracture propagates into an adjacent non-producing solid formation, the materials used to maintain a fracture after the fluid pressure has decreased may be wasted in areas outside the objective formation area. In short, it is potentially dangerous and extremely costly to save a well that has been fractured out of the of the hydrocarbon zone.

Because of the serious problems that can occur as a result of out of zone fractures, it is desirable to monitor formation fracture movements. There are several techniques and devices used for monitoring and evaluating formation fracture movements such as radio-active tracers in the fracturing fluid, temperature logs, borehole televiewers, passive acoustics and gamma-ray logging. Most techniques provide some direct estimates of fractured zone height at the wellbore. However, fracture height determination away from the well is based on inferences.

One process used to monitor formation fractures employs radio-active tracers. In this process, fracturing fluid containing a radio-active tracer is injected into the formation to create and extend the fractures. When these radio-active fluid and proppant tracers are used, post fracture gamma-ray logs have shown higher levels of activity opposite where the tracer was deposited, thereby enabling operators to monitor the progress of the fractures.

Another common approach for determining fracture height uses temperature and gamma-ray logs. Temperature logs made before and after stimulation are compared to define an interval cooled by injection of the fracturing fluid and thus provide an estimate of the fractured zone. However, this technique is subject to limitations and ambiguities. For example, the temperature log may be difficult to interpret because of low temperature contrast, flowback from the formation before and after the treatment, or fluid movement behind the borehole casing.

Another approach using a borehole televiewer is limited in that it can only be used for fracture height evaluation in open holes. Acoustical methods are hampered by inhomogeneous formation impedance and/or the need for pumping while the tool is in the hole.

In addition to the specific problems associated with each type of monitoring, there are inherent problems in the present formation fracturing technology. During the fracturing process, fracture fluid is generally pumped into the formation at extremely high pressure, to force open the fractures, and an increasing proportion of sand is added to the fluid to prop open the resulting fractures. One problem with the existing technology is that the methods for determining whether a formation has been fractured out of the production zone rely on post-treatment (after the fracture has occurred) measurements. In such systems, a fracturing treatment is performed, the treatment is stopped, the well is tested and the data is analyzed. Moreover, with most known detection systems, the wait for post-fracturing data can take a considerable amount of time, even up to several days, which can delay the completion operations, resulting in higher personnel and operating costs. None of the logging tools or methods are capable of detecting the propagation of fractures in real time (during the injection of fluid).

Another problem associated with existing post-process "logging" or measuring devices is that the cost associated with interrupting a fracturing job in order to take a measurement of a fracture is not practical or feasible. Because fracture fluid is pumped into a formation under high pressures during the fracturing process, temporarily halting the pumping and fracturing operation will relieve the fluid pressure which could lead to undesirable results such as the closing of the fractures, thereby causing the reversal of fluid flow back into the borehole, or the build-up of sand in the hole. In addition, after taking measurements and completing the logging process, operators cannot restart the pumping equipment at the point of the fracturing process immediately before the interruption. Instead, the operators would have to repeat the complete fracturing job at additional cost and with unpredictable results. Furthermore, it may even be impossible or impractical to repeat the job.

As a result, the present formation fracturing technology is not reliable because operators must make preliminary estimates of and guesses at the length of the fracturing job, the rate of increase of sand concentration into the formation fracture and other fracture process factors. Existing measurement methods are limited to a retrospective view of the fracturing job, and only after the possible occurrence of damage.

A real-time monitoring system could address the above described problems and would allow well operators to monitor the fracturing process, to control fracture dimensions and to efficiently place higher concentrations of sand proppants in a desired formation location. In addition, if there is information that a fracture is close to extending out of a desired zone, operators can terminate the fracturing job immediately. Furthermore, real-time analysis of the ongoing treatment procedure will enable an operator to determine when it is necessary to pump greater concentrations of said proppant, depending on factors such as the vertical and lateral proximity of oil/water contacts with respect to the wellbore, the presence or absence of water-producing formations and horizontal changes in the physical properties of the reservoir rock.

This real-time monitoring system could be implemented using radio-active tracers in the fracturing fluid. As previously described, as the fracturing fluid progresses through the formation fracture, gamma-rays from the tracer element are detected and give an indication of the location of the fracture in the formation. However, even these real-time methods have to overcome obstacles. One such obstacle is distinguishing tracer element gamma-rays from gamma-rays from other sources.

One solution for distinguishing borehole activity from formation fracture activity is described in U.S. Pat. No. 4,731,531 to Handke, which describes a technique of inserting into borehole a tracer material that is non-radioactive. The material will not be activated until just before it is injected into the formation. With this technique, there is little borehole activity, therefore, only the formation fracture activity will be detected. However, there are questions and concerns about the ability to energize the non-radio-active material to a radio-active level that will produce gamma-rays with sufficient energy to be detected at the wellbore.

Another approach is described in U.S. Pat. No. 3,784,828 to Hayes, wherein two radiation detectors of different sensitivities respond to a radioactive tracer that has been discharged into the formation at the well depth of interest. This technique shows a radioactive tracer technique for distinguishing vertically flowing liquids in formation fractures from flows through passageways in the cement annulus between the steel casing and the borehole wall. If the tracer material moves in a vertical direction with respect to the injection depth, relatively high gamma-ray count rates from both detectors indicate that the tracer is flowing vertically through a fracture in the cement. Whereas, a relatively low count rate in the less sensitive detector, indicates that the vertical flow is taking place away from the casing and at some depth within the formation. Once again, this procedure does not address the problem of distinguishing tracer elements from gamma-rays from other sources. Because of the configuration of the tool and the operation of the technique, this invention does not encounter the problem of having to distinguish gamma-rays from various sources.

In U.S. Pat. Nos. 4,415,805 (Fertl et al.) and 4,861,986 (Arnold) distinctions are made using several different radioactive tracer elements. In Fertl, multiple stage fractures use different radioactive tracer elements injected into the well during each stage of the fracturing operation. After completion of the fracturing operation, the well is logged using natural gamma-ray logging. In Arnold, different isotopes are simultaneously injected and each isotope is detected by a detector which detects a specific energy range. Again, these techniques are not designed to address the problems which are of concern to the present invention.

Therefore, a real-time formation fracture monitoring system is needed in order to permit formation fracturing without encountering the above-mentioned problems.

SUMMARY OF THE INVENTION

It is an object of this invention to monitor and evaluate a formation fracture growth as the fracture occurs during the fracturing process.

It is an object of this invention to detect the vertical movement of a fracture during the fracturing process.

It is an object of this invention to distinguish between gamma-rays caused by radio-activity of a fracturing fluid in the borehole and gamma-rays caused by radio-activity in the formation fracture.

It is an object of this invention to control the vertical extension of a fracture in the formation.

It is an object of this invention to prevent fractures in the formation areas out of the zone of production.

It is an object of this invention to provide a faster and more reliable method of evaluating formation fractures.

It is an object of this invention to provide a method of monitoring formation fractures without using spectral analysis.

It is an object of this invention to develop, detect and monitor fractures in multiple zones of a formation simultaneously.

The present invention provides a method and system to evaluate and monitor formation fractures during the fracturing process ( in real-time ). The system of the present invention for performing formation fractures comprises a fracturing fluid containing a radio-active tracer element and a proppant, a means for allowing fracturing fluid to enter the formation and a means for monitoring the the movement of a tracer element in the fracturing fluid by detecting and counting gamma-rays emitted by the tracer element in the formation. The location in the wellbore of a detector means that detects and counts the gamma-rays is predetermined and is related to the desired maximum fracture height or vertical depth. Since radio-active fracture fluid is pumped down a wellbore annulus into the formation, gamma-rays are emitted by the fluid as the fluid passes the detector means. Consequently, the detector means detects gamma-rays from both the formation fluid and the wellbore fluid. Therefore, the detector means must be able to distinguish between gamma-rays that are emitted by the fracturing fluid in the wellbore and the fracturing fluid in the formation. In the preferred embodiment of this invention, the process of distinguishing gamma-rays is performed by using a detector means that is a differential detector pair.

The method of the present invention comprises the steps of injecting a fracturing fluid containing a radioactive tracer element into an earth formation while simultaneously detecting gamma-rays emitted from the injected tracer element in the fracture fluid. The movement of the tracer element in the formation is monitored by counting detected gamma-rays. From the formation fracture fluid movement there is a determination of the formation fracture height and vertical depth.

In the present invention, a fluid containing a radioactive tracer element is pumped at a high pressure down a wellbore into a formation. The pressure of fluid breaks up the formation and creates fractures in the formation, as is done in conventional formation fracturing. However, as the fracturing fluid moves through the formation creating and extending fractures, gamma-rays are emitted from the radio-active tracer element in the fluid. In one method of the invention, differential detector pairs placed at predetermined locations in the wellbore detect these gamma-rays. During the detection of the gamma-rays, the gamma-ray count increases as the fracture fluid approaches the height and vertical depth of the detectors. As the fracture approaches the height of the lower detector pair, the count in that detector will increase much faster than the count of the higher positioned detector. Once the difference in gamma-ray counts between the two detectors reaches a predetermined level, the fracture will have reached a desired location in the formation and the pumping of the fracture fluid will be stopped.

If only the formation fracture height or vertical depth is desired, the present invention can be implemented by using only one detector means placed at a location in the wellbore of the desired fracture fracture height or vertical depth.

In this invention, multiple zones of a formation can also be monitored simultaneously by placing detectors at desired fracture heights and vertical depths in each zone of the formation and pumping the fracture fluid into each formation zone and monitoring the growth of the fracture through the detection of the gamma-ray counts at each detector.

DESCRIPTION OF THE PREFERRED EMBODIMENT

Figure 1:
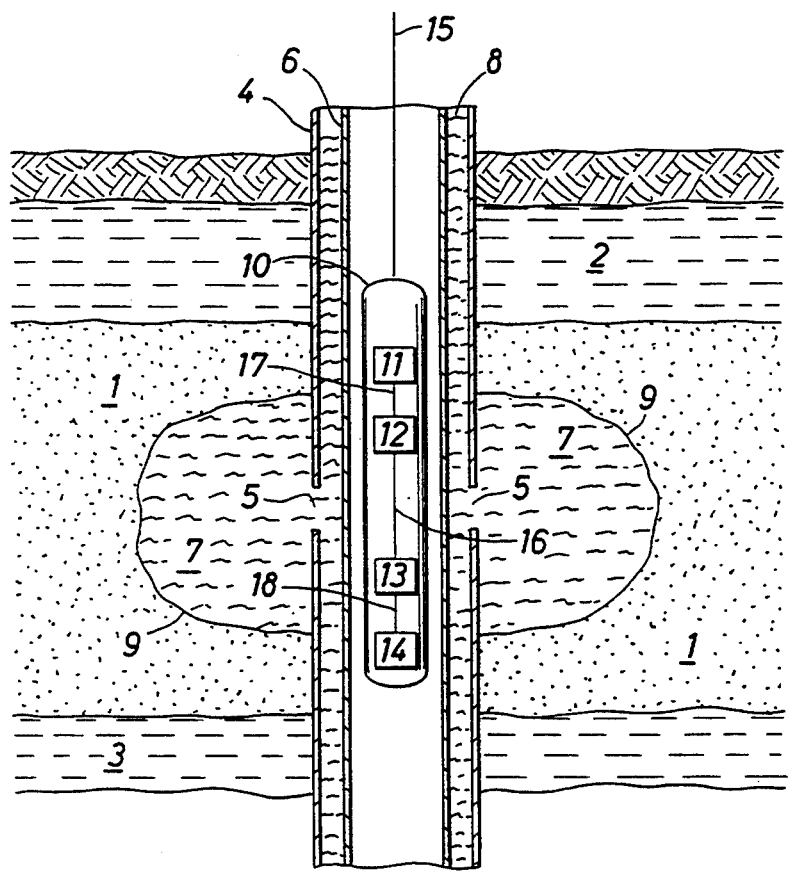
FIG. 1 is a schematic representation of the tool showing pairs of differential detectors to detect fracture heights and depths.

A formation fracturing process can be monitored and evaluated in real-time by implementing the present invention. Referring to FIG. 1, the preferred embodiment of the invention involves fracturing a hydrocarbon formation 1, such as an oil or gas formation, with a fracturing fluid 7. Also shown in FIG. I is a casing 4 that is cemented along the wall of the wellbore through the formations and is perforated at the location 5. A tubing 6 made of steel is installed inside the casing prior to any injection of fracture fluid 7 into the annulus 8. The tubing 6 normally provides the means for producing the hydrocarbons, but on this invention, the tubing provides protection for the logging tool. Normally the fracture fluid is pumped down the tubing but in this case it is effectively being used to protect the tool. The fracture fluid 7 is injected down the wellbore annulus 8 and through casing perforations 5 into the formation.

In FIG. 1, the producing hydrocarbon formation 1 is between an upper water bearing formation 2 and a lower water bearing formation 3. In this embodiment, the presence and locations of the upper 2 and lower 3 water bearing formations are known. These locations are usually determined prior to the fracturing process from open hole logs. In addition, test procedures can be performed to determine the properties of the rock material making up the formation and stress levels of the formation. Generally, the initial fracturing and other testing performed in the wellbore provide the in situ least principal stress direction of the formation, the stress level above, in and below the subterranean formation to be fractured, the hydraulic pressure required to fracture the formation, the fracture closure pressure and the fracture extension pressure. Using such information, operators can determine the optimum conditions for fracturing the formation. These optimum conditions include the particular type of fracturing fluid to be used and the fracturing fluid pumping rate required, the depth, angle and direction of any deviated wellbore to be drilled, the spacing of the fracture initiation points in the wellbore, the size and number of perforations required at each initiation point, and other known and desirable conditions. These conditions are determined prior to fracturing by known methods in the art.

As mentioned previously, the major concern is that a fracture into the water bearing zone will enable the water to enter the hydrocarbon producing formation 1 and mix with the desired hydrocarbon. To avoid the risk of fracturing into the water bearing formations and causing water breakthrough, operators of the well typically decide prior to fracturing the formation 1, the upper and lower locations/boundaries in the formation of which they would not like the fracture to extend. The operators also determine the desired gamma-ray counts that will give the best indication of the proximity of the fracture, at any given time during the fracturing process, to the upper 2 and lower 3 formation locations.

The application of hydraulic pressure to the formation by way of the perforations 5 in the casing involves the pumping of a fracturing fluid down the wellbore 5 and into the formation at a rate and pressure and for a time sufficient to cause the fracturing fluid to flow through the perforations and extend the fractures a predetermined length away from the wellbore and into the formation. The fracturing process also includes depositing a propping agent into the fractures. The pumping is then terminated, the wellbore is shut in for a time, the fracturing fluid is reverse flowed back to the surface and the well is placed on production.

Figure 2:
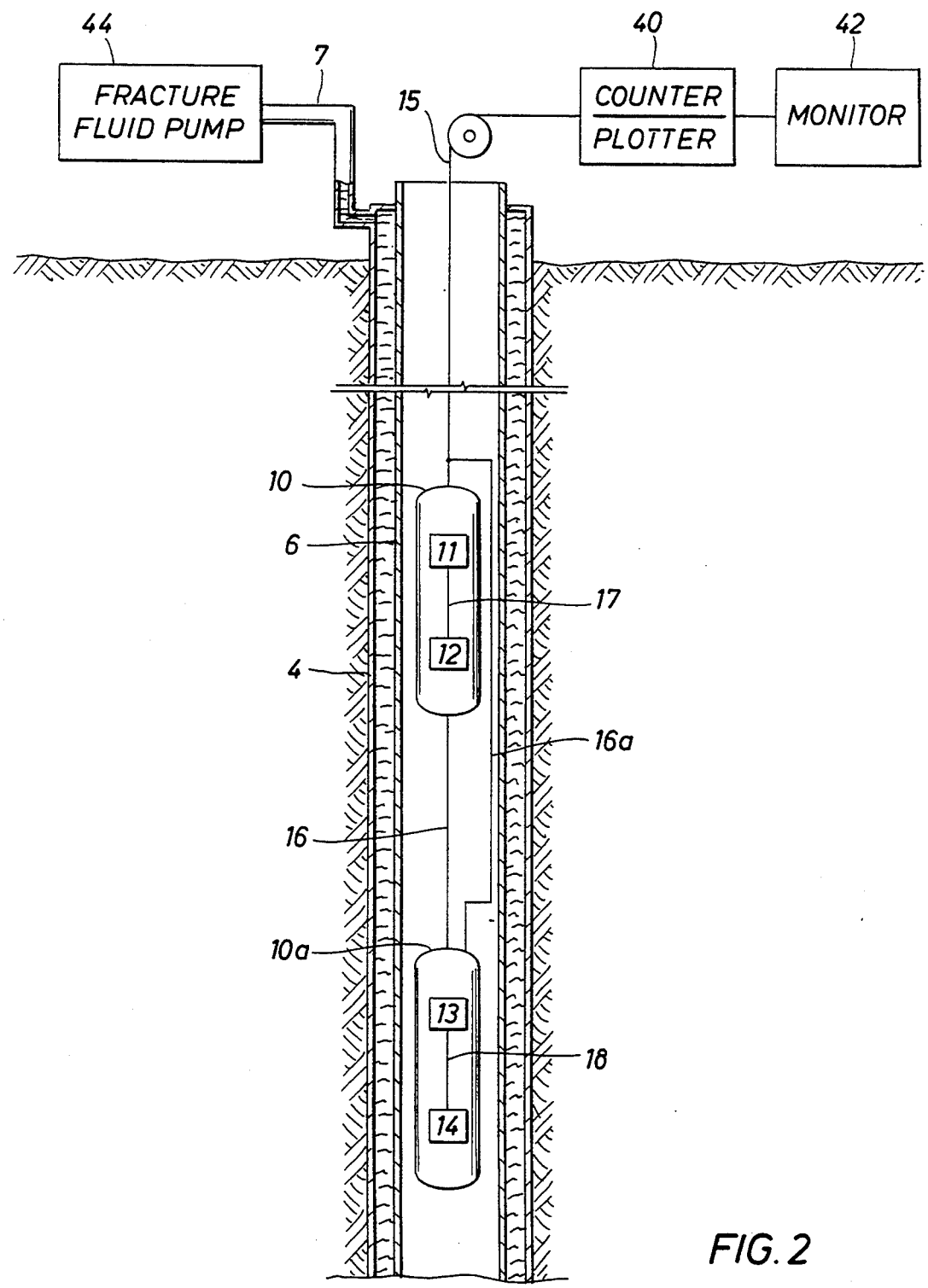
FIG. 2 is a schematic representation of the tool showing a configuration of the tool with surface equipment.

In this invention, the fracture fluid 7 contains a radio-active tracer element and a proppant. The fracturing fluid, a proppant, and a radio-active tracer element 7 are pumped down the annulus between the tubing 6 and the casing 4. While numerous tracer elements can be used, the preferred tracer is a material such as scandium or iridium and possibly zirconium or iodine. The proppant material is usually sand. The tagged fracture fluid enters the formation through the perforation in the casing at location 5. As the fluid is pumped under high pressure into the formation 1, fractures are created and extended and the fluid migrates through the formation through the created fracture. The tracer element in the fluid emits gamma-rays that are detected by detector means 11 and 12 and by detector means 13 and 14 that are housed in a logging tool 10 located in the wellbore. The tool 10 can be any standard logging tool capable of gamma-ray logging tool of such as is known in the industry. The detector means can be two wireline tools with gamma-ray detectors, (as shown in FIG. 2) spaced approximately 4 feet (120 centimeters) apart, and can be employed to detect the gamma-rays emitted by the tracer element during real time monitoring of fracture height and depth. The detectors can be known types of scintillation detectors capable of detecting and counting gamma-rays.

Referring to FIG. 2, the wireline tool containing detectors 11 and 12 and the wireline tool containing detectors 13 and 14 are located inside the tubing 6. The upper tool contains gamma-ray detectors 11 and 12 and the lower tool contains gamma-ray detectors 13 and 14. The two wireline tools are attached to each other via a cable 16 or 16a. The length of cables 16 and 16a have been previously determined so that the midpoints 17 and 18 of each tool (pair of detectors) can be located at a position relative to the formation beyond which it is undesirable for the fracture height or vertical depth to extend, either in the upward or downward direction in order to avoid fracturing out of the hydrocarbon zone of the earth formation.

In accordance with this embodiment of the invention, the detectors 11, 12, 13 and 14 are counting detectors that produce an output signal in response to an incident gamma-ray. In this process, for example, a gamma-ray that is emitted from a slug of tracer material penetrates the interposed casing materials 4 and the outer surface of the detector in order to enter the active volume of the detector. This produces an electrical charge pulse at a detector output that is sent through a conductor 15 to a gamma-ray plotter/counter 40 at the surface where each charge is registered as a count for the specific detector. Real-time plots of the gamma-ray counts are sent to the monitor 42 where they can be observed and used by the operators to control the injection of fracturing fluid into the formation from the pump 44 and thereby control the development and movement of a formation fracture.

It should be noted that the detectors 11 and 12 and 13 and 14 may be appropriately shielded from any direct background radiation that might originate in the tracer reservoir (not shown) within the tool housing 10.

The key to this embodiment of the invention is the use of dual gamma-ray detectors operating in a differential mode to remove the wellbore signal created by the fracturing fluid flowing down the annulus 8. Referring to FIG. 1, in the operation of the invention, the fracture fluid 7 must be pumped into the formation until the fracture front 9 (edge of the fracture) in the formation reaches either the desired upper level 17 or lower level 18 locations in the formation. Detector pairs detect the upper and lower fracture front 9 and the fracture front location is determined from the difference in gamma-ray counts of the detectors in the detector pair. In some methods using only one gamma-ray detector in each wireline tool, the activity from the annulus at the location of the detectors, would entirely swamp the lesser signal that comes from the fracture fluid that is in the formation. Another important fact that was considered during the development of this invention is that the flow of the fracturing fluid is very fast in the annulus, approximately 10 feet (300 centimeters) per second, but slow approximately 1.2 inches (3 centimeters) per second in the formation. Therefore, the fracture front in the formation is considerably slower than the fluid in the annulus. This slow movement enables the count rates to be filtered over a reasonable time such as 10 to 30 seconds to improve the statistics of the differential signal without losing the sensitivity to monitoring the slower moving fracture front 9 in the formation.

Figure 3:
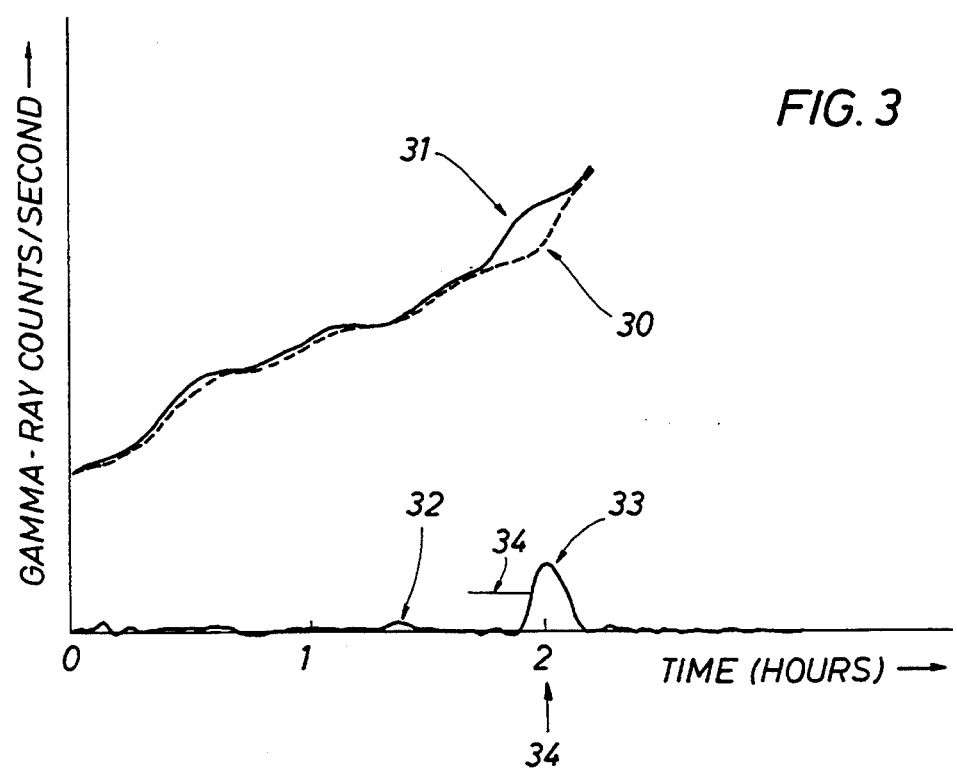
FIG. 3 is a plot of the count rate indicating the movement of the fracture front in the formation even in the presence of a large and variable signal from the annulus region.

The ability of the differential signal to extract the formation signal from the annulus signal is best demonstrated by referring to FIG. 3. In FIG. 3, the plot shows the varying count rate with reference to time from gamma-ray detectors 11 and 12. The same explanation herein would apply to detectors 13 and 14. As shown, the count rates from signals 30 and 31 (representing detectors 11 and 12 respectively) can change with time because very often, the amount of proppant that is included in the fracture fluid is varied as the fracture progresses in the formation. When the two detectors are used in a differential mode, as described in this embodiment, the pair of detector count rate signals 30 and 31 basically track each other when the signals are from the annulus as shown by signal 32. This similarity of signals leads to a net differential signal of approximately zero. However, when the fracture front 9 arrives at position 18 in the formation, detector 12 will see the formation signal and will begin to detect and count formation gamma-rays before detector 11 in addition to detecting the annulus signal. With detector 12 seeing both the annulus and formation signals, but detector 11 only seeing the annulus signal a net differential signal is created between signals 30 and 31 which is easy to distinguish above the practically zero background level. Once the peak (difference in signals), 33, reaches a statistically significant level 34 above the differential background signal, the pumping of the fracture fluids is stopped since the fracture front has arrived at a desired location in the formation. In this example, the signal reached the statistically significant level at approximately two hours after the fracturing process began. From the example in FIG. 3, it is clear that if only one detector were used it would not be possible to detect the arrival of the fracture front at approximately 2 hours 35 after the start of the fracturing process, because the formation signal would be lost in the variable annulus signal.

Figure 4:
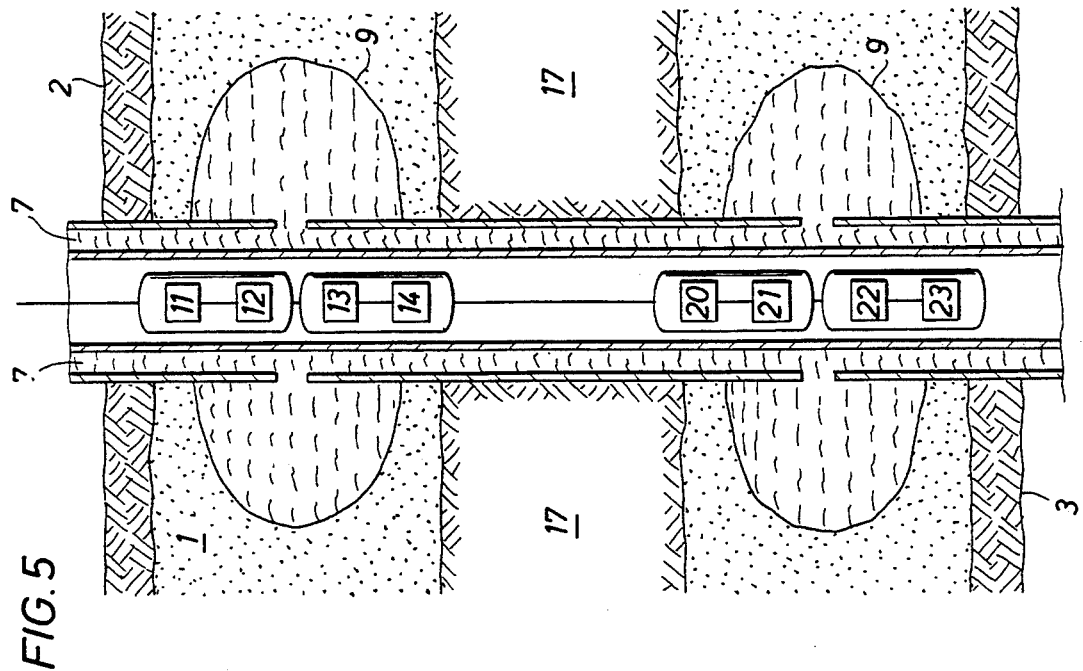
FIG. 4 is a schematic representation of the tool showing a pair of differential detectors detecting only the upward movement of the formation fracture front.

In some situations, it may be sufficient to monitor the movement of a fracture in only one direction. FIG. 4 shows an embodiment of this invention that can be used for the purpose of only monitoring the vertical movement of the fracture in one direction. This embodiment could be used when the hydrocarbon producing zone is close to a water producing zone and where no other adjacent formation zone is a real concern. In this embodiment, the detector means contains a pair of detectors 11 and 12 housed in a tool 10. This tool 10 is positioned in the wellbore at a location that is related to the desired height or vertical depth of a formation fracture. As shown in FIG. 4, the vertical depth of the fracture is not a significant concern to the operation. The two detectors 11 and 12 operate as a differential detector pair in the same manner as described in FIG. 1.

Figure 5:
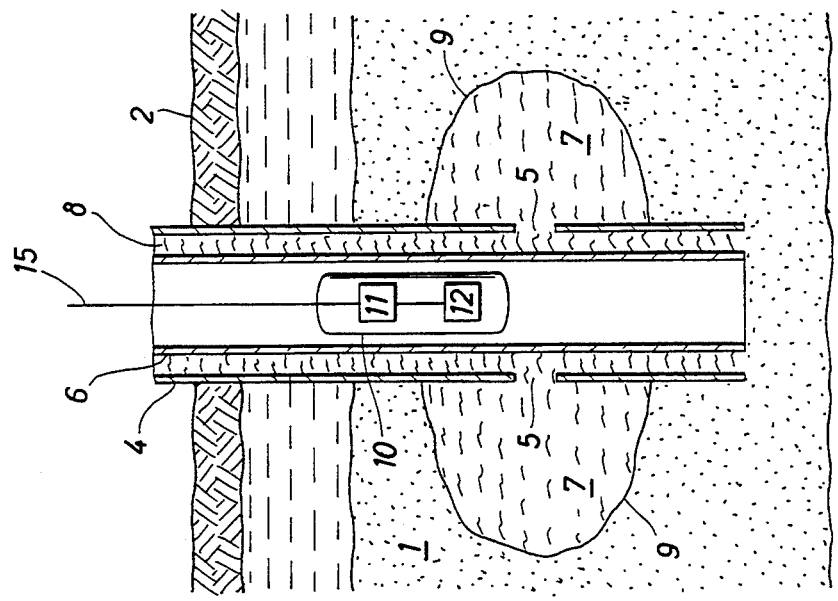
FIG. 5 is a schematic representation of the tool showing multiple pairs of differential detectors used to simultaneously detect fracture movements at multiple depths in the formation.

In still another embodiment of this invention, multiple zones being fractured can be monitored at the same time as illustrated in FIG. 5. This design operates in a similar manner to other embodiments and implements the same concept of detecting formation gamma-rays using differential detector pairs. In FIG. 5, detectors 11, 12, 13 and 14 monitor the upper formation fractures and detectors 20, 21, 22 and 23 monitor the lower formation fractures. If multiple zones are being fractured, this embodiment does not require the use of different radio-active tagging agents as is required by current multiple zone fracturing methods.

Although preliminary calculations are made for the amount of fracture fluids and proppants that should, in theory, create a fracturing system extending from the desired upper level of the fracture to the desired lower fracture level, there is never any certainty of the desired results. In some cases, too little fracture fluid volume is pumped into the formation resulting in an inefficient fracture. In other case an even worse result occurs where the fracture propagates more quickly than expected and reaches one of the water bearing formations.

The various embodiments of this invention provide an advantage over other methods of detecting fractures in that this method does not require spectral analysis of the detected gamma-rays. As previously discussed, the present invention uses only the total gamma-ray count to monitor formation fractures. By using only total gamma-ray counts, the process is simpler and faster to implement and is more reliable.

The method and system of this invention describes techniques that enable operators to perform real-time monitoring of a fracture during a formation fracturing procedure. However, the basic formation fracturing procedures currently used remain the same. Therefore, particular details about techniques and other information pertaining to the fracturing process are not discussed in this application and should be known or obvious to persons skilled in the art.

The method and system of this invention provides significant advantages over the prior art. The invention has been described in connection with preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method for real time monitoring of an earth formation fracture location during the fracturing of said formation comprising the steps of:
    (a) injecting a radio-active tracer element into an earth formation during the fracturing of said formation;
    (b) continually detecting and counting gamma-rays emitted by the tracer element;
    (c) monitoring tracer element movement in an earth formation fracture by continually maintaining a current count of detected gamma-rays generated by said tracer element; and
    (d) simultaneously with step (c), determining formation fracture height and vertical depth from the movement of the tracer element.

2. The method of claim 1 wherein the tracer element is injected into the earth formation from the earth surface through a borehole annulus.

3. The method of claim 1 wherein the formation fracture movement is monitored by detecting a signal generated by the tracer element, distinguishing the portion of the detected signal that is a tracer element signal from the formation and a tracer element signal from the borehole annulus and deriving the tracer element's approximate location in the formation fracture from the formation tracer element signal.

4. The method of claim 3 wherein the derived location of the tracer element indicates the height and vertical depth of the fracture in the formation.

5. The method of claim 3 wherein only the fracture height or vertical fracture depth is monitored.

6. The method of claim 1 wherein the tracer element in the formation is detected and monitored using a differential detection means.

7. The method of claim 6 wherein the differential detection means comprises a first detector that detects primarily the borehole annulus tracer elements and generates a first tracer signal, and a second detector that detects borehole and formation tracer elements and generates a second tracer signal.

8. The method of claim 7 wherein the formation fracture height and vertical fracture depth are each determined from the differences in gamma-ray counts of the detectors in the differential detection means.

9. The method of claim 8 wherein said differential detector means are positioned at a desired fracture height and at a desired vertical fracture depth.

10. The method of claim 9 wherein a differential signal is generated from the detector means, said differential signal being the difference between signals detected by said detectors in said detector means.

11. The method of claim 10 wherein formation fracture height and vertical fracture depth are determined from the differential signal.

12. The method of claim 10 wherein said differential signal is derived from said first and second tracer signals.

13. The method of claim 12 wherein the first tracer signal and the second tracer element signal are distinguished by first counting the number of gamma-rays that pass through the annulus at a first detector location, second counting the total number gamma-rays detected from annulus and formation at a second detector location and deriving a fracture formation tracer signal from the difference in gamma-ray counts of the two signals.

14. The method of claim 9 wherein the desired fracture height and vertical fracture depth are locations that are between detectors of said differential detector means.

15. The method of claim 14 wherein the desired fracture height and vertical fracture depth are the locations that are the midpoints between detector pairs of said differential detector means.

16. A method for real time determination of the vertical length of an earth formation fracture during the fracturing process that is creating said fracture comprising the steps of:
   (a) positioning a detector means in a borehole that traverses an earth formation to be fractured;
   (b) fracturing the formation by injecting a formation fracturing fluid containing a radio-active tracer element through the borehole into the earth formation, thereby creating a formation fracture;
   (c) detecting gamma-ray signals emitted from the tracer element at the detector means, while simultaneously fracturing the formation with said fracturing fluid; and
   (d) continually determining vertical movement and current location of a formation fracture, created by the fracture fluid in the formation, from the detected gamma-rays, while simultaneously extending the formation fracture and detecting gain ma-ray signals.

17. The method of claim 16 wherein at least two detectors are used to detect the height of a formation fracture and at least two detectors are used to detect the vertical fracture depth of said formation fracture.

18. The method of claim 16 further comprising before step (d) the step of generating a count of the total number of detected gamma-rays at each detector means location.

19. The method of claim 18 wherein the location of the fracture is determined by continuously comparing gamma-ray counts of first and second detectors and continuously comparing gamma-ray counts of third and fourth detectors.

20. The method of claim 19 wherein movement of the fracture height is determined from the difference in gamma-ray counts of the first and second detectors and movement of the vertical fracture depth is determined from the difference in gamma-ray counts of the third and fourth detectors.

21. The method of claim 19 wherein the fracturing process is continued until the difference in gamma-ray counts between first and second detectors or the difference in gamma-ray counts between third and fourth detectors equals a predetermined number.

22. A system for real time monitoring of an earth formation fracture during a formation fracturing process comprising:

(a) a radio-active tracer element to be injected into the formation;
(b) a means for allowing the tracer element to enter the earth formation; and
(c) a detector means for detecting signals from the tracer element in the earth formation, the detector means comprising means for distinguishing between tracer element signals from the formation and tracer element signals from the borehole annulus during the formation fracturing process.

23. The system of claim 22 wherein the detector means is a differential detector system.

24. The system of claim 23 wherein the differential detector system comprises at least one pair of detectors to detect the formation fracture movement in one of the directions parallel to the borehole annulus in which said at least one detector pair is positioned.

25. The detector means of claim 23 wherein the differential detector system comprises at least two pair of detectors, one detector pair to monitor the fracture height and one pair to monitor the vertical fracture depth.

26. The differential detector system of claim 25 wherein a detector pair comprises a first detector and a second detector, said first detector being positioned above said second detector in a borehole.

27. The detector system of claim 26 wherein said detector pairs are contained in a wireline tool.

28. The detector system of claim 26 wherein a said detector pair is positioned in the borehole such that the location in the formation beyond which it is undesirable for the fracture to extend is between said detectors in said detector pair.

29. The system of claim 25 further comprising a suspension means that connects the detector pairs to each other and suspends said detector pairs in the borehole.

30. The system of claim 29 wherein the suspension means is a cable.

31. The detector system of claim 25 further comprising a plurality of differential detector pairs for detecting formation fractures at multiple vertical depth locations in the formation.

32. A method for real time monitoring of an earth formation fracture location during the fracturing of said formation comprising the steps of:
   (a) injecting a radio-active tracer element into said earth formation during the fracturing of said formation;
   (b) detecting and counting gamma-rays emitted by the tracer element while simultaneously fracturing the formation; and
   (c) continuously determining the approximate formation fracture location in the direction parallel to a wellbore in which detector means are located by continuously determining a count of detected gamma-rays generated by said tracer element during the formation fracturing process.

* * * * *